UNITED STATES PATENT OFFICE.

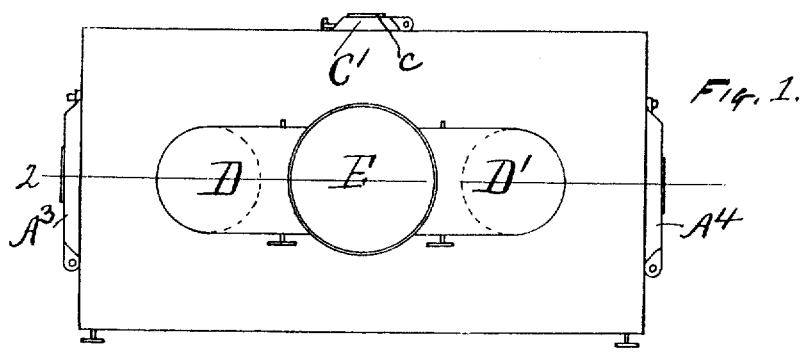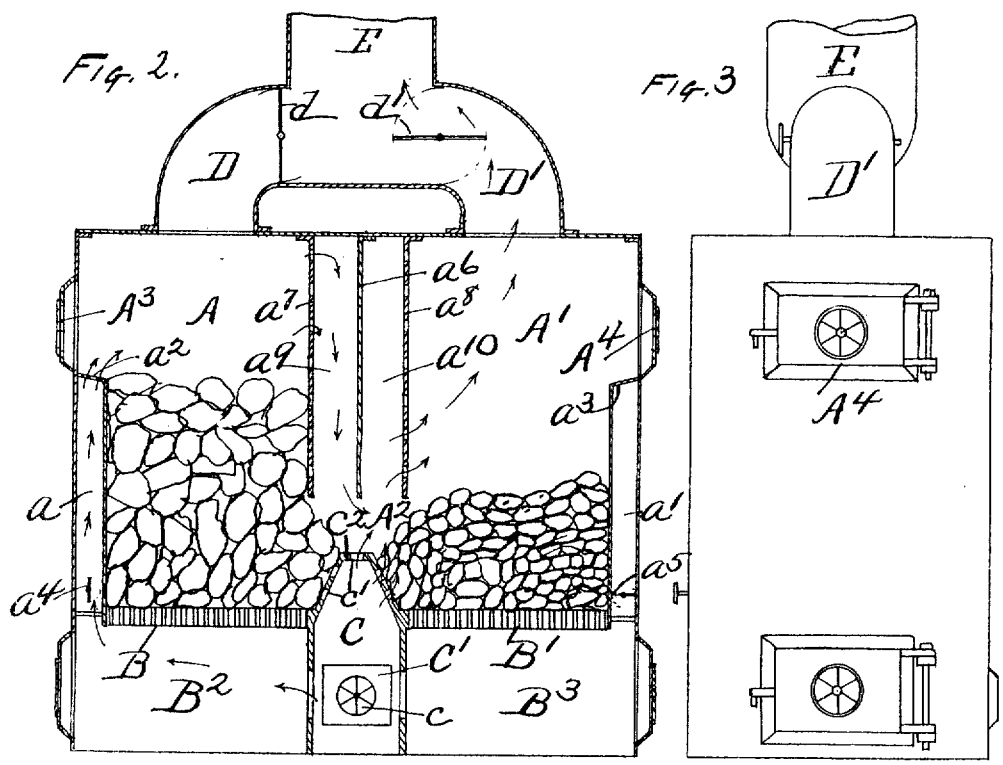

JAMES C. OSBORNE, OF ERIE, PENNSYLVANIA.

FURNACE.

938,693.  Specification of Letters Patent.  Patented Nov. 2, 1909.

Application filed June 25, 1906. Serial No. 323,292.

*To all whom it may concern:*

Be it known that I, JAMES C. OSBORNE, a citizen of the United States, residing at Erie, in the county of Erie and State of Pennsylvania, have invented new and useful Improvements in Furnaces, of which the following is a specification.

This invention relates to furnaces and consists in certain improvements in the construction thereof as will be hereinafter fully described and pointed out in the claims.

In carrying out my invention, I use combustion chambers preferably separated by an intervening wall and provided with draft passages so that fuel may be introduced to the chambers alternately and the gases from the fresher fuel carried through the chamber having the fuel in the later stages of combustion whereby all the gases and smoke may be consumed.

I have shown my invention as applied to a domestic furnace.

The invention is illustrated in the accompanying drawings as follows:

Figure 1 shows a plan view of the furnace. Fig. 2 shows a section on the line 2—2 in Fig. 1. Fig. 3, a side elevation of the furnace.

The furnace has the two combustion chambers A and A'. An air supply passage $a$ preferably leads up to near the top of the combustion chamber A entering the chamber A through the openings $a^2$. A similar passage $a'$ with openings $a^3$ is provided in the chamber A'. The passages $a$ and $a'$ are provided with the dampers $a^4$ and $a^5$ respectively. The chambers are provided with the grates B and B' respectively, and are arranged over the ash pits $B^2$ and $B^3$. The chambers are separated by an imperforate plate $a^6$ and arranged at each side of this plate are the perforated plates $a^7$ and $a^8$ forming the gas passages $a^9$ and $a^{10}$. An air supply chamber C is arranged between the ash pits $B^2$ and $B^3$. This is provided with the draft door C' in which is arranged a draft plate $c$. The air supply chamber C has the upwardly extending portion $C^2$ arranged between the combustion chambers. The part $C^2$ has the perforations $c'$ leading into the chambers. The chambers A and A' have the discharge or smoke flues D and D'. The flues D and D' are provided with the dampers $d$ and $d'$ respectively and these flues discharged into the smoke stack E. The chamber A is provided with a door $A^3$ for the introduction of the fuel and the chamber A' is provided with the door $A^4$ for a similar purpose. The partition $a^6$ is of such length as to form an opening $A^2$ connecting the two chambers.

In the operation of the furnace, fuel is first coked in one of the chambers, as for instance in the chamber A', and during this process, the damper D' remains open. Fresh fuel is then arranged in the chamber A and is ignited, and the gas from this fuel passes through the perforated plate $a^7$ through the passage $a^9$ through the opening $A^2$ into the chamber A'. Air is introduced to support this combustion through the passage $a$ and also through the openings $c'$, so that the gases as they move from one chamber to the other have sufficient air mixed with them to support combustion. After the fuel in the chamber A is coked and the fuel in the chamber A' practically consumed, fresh fuel is introduced into the chamber A' and the dampers reversed. That is, the damper $a^4$ is closed; the damper $a^5$ opened; the damper $d$ opened, and the damper $d'$ closed so that the gases are carried from the chamber A' through the perforated plate $a^8$ through the opening $A^2$ to the chamber A. This process is repeated, fuel being fed alternately to each furnace and the direction of the gases reversed alternately as the furnace is operated. By this process, the gases are entirely consumed and smoke prevented.

What I claim as new is:

1. The combination of two combustion chambers, each provided with means for the introduction of fuel and air near the top thereof, said chambers being formed with an intercommunicating opening near the bottom thereof; and means for alternating the direction of the draft through said chambers.

2. The combination of two combustion chambers, each having an opening for the introduction of fuel near the top of the chamber, said chambers being separated by division plate $a^6$ between the chambers and having an intercommunicating opening between the chambers beneath the division plate; the perforated plates $a^7$, $a^8$, one at each side of and adjacent to the division plate $a^6$ forming the flues $a^9$ and $a^{10}$ respectively for the passage of gases moving from one chamber to the other and means for alternating the direction of draft through the chambers.

3. The combination of two combustion chambers each provided with means for the introduction of fuel and air near the top thereof, said chambers being formed with an intercommunicating opening near the bottom thereof, means for alternating the direction of the draft through the chambers, an air supply chamber arranged beneath the intercommunicating opening between the chambers and having a means of communication with the chambers adjacent to said opening.

4. The combination of two combustion chambers each provided with means for introducing fuel near the top thereof, and each provided with an air supply passage leading from below the chamber to the top of the chamber, said chambers being provided with an intercommunicating opening near the bottom thereof; means for alternating the direction of the draft through the chambers; an air supply chamber below the intercommunicating opening, and having a means of communication with said chambers adjacent to intercommunicating openings; and a means of communication between the air supply chamber and air supply passages leading to the tops of the fuel chambers.

In testimony whereof I have hereunto set my hand in the presence of two subscribing witnesses.

JAMES C. OSBORNE.

Witnesses:
E. Woods,
B. F. Parker.